United States Patent [19]
Grajewski et al.

[11] Patent Number: 5,727,100
[45] Date of Patent: Mar. 10, 1998

[54] DEVICE FOR CONNECTING TWO ELECTRIC AERIAL CABLES

[75] Inventors: Franz Grajewski; Werner Stieb; Zbigniew Wielgolaski, all of Stadthagen; Ulrich Jansen, Wassenberg; Rudolf Buchwadd, Rednitzhembach, all of Germany

[73] Assignee: Alcatel Kabel AG & Co, Germany

[21] Appl. No.: 685,876

[22] Filed: Jul. 24, 1996

[30] Foreign Application Priority Data

Jul. 29, 1995 [DE] Germany .................. 295 12 268.4

[51] Int. Cl.$^6$ .................................... G02B 6/36
[52] U.S. Cl. .................................... 385/53
[58] Field of Search .................. 385/53, 69, 88, 385/89, 100, 101, 147

[56] References Cited

U.S. PATENT DOCUMENTS

| | | | |
|---|---|---|---|
| 3,566,007 | 2/1971 | O'Keefe et al. | 174/88 C |
| 3,617,968 | 11/1971 | Wakeam | 336/192 |
| 3,679,811 | 7/1972 | Gorin | 174/72 B |
| 3,713,076 | 1/1973 | Gabrielian et al. | 439/352 |
| 4,230,389 | 10/1980 | Kotski | 439/371 |
| 4,271,585 | 6/1981 | Satti | 174/125.1 |
| 4,343,665 | 8/1982 | Pugh | 174/15.6 |

FOREIGN PATENT DOCUMENTS

| | | |
|---|---|---|
| 0508884 | 10/1992 | European Pat. Off. |
| 0548514 | 6/1993 | European Pat. Off. |
| 3835793 | 4/1990 | Germany |
| 4012183 | 10/1990 | Germany |
| 4126464 | 2/1993 | Germany |
| 9313026 | 11/1993 | Germany |
| 4232714 | 3/1994 | Germany |

*Primary Examiner*—Akm E. Ullah
*Attorney, Agent, or Firm*—Ware, Fressola, Van der Sluys & Adolphson LLP

[57] ABSTRACT

A device is described for connecting two electric aerial cables. Each aerial cable has tube, containing optical fibers, which is cabled with electric conductors and strength member. Means are provided for the mechanical and electrically conductive joining of the electric conductors and strength members of the two cables. A sealed splice carrier for receiving the spliced connections of the optical fibers comprises two concentric tubes (7, 9) with a annular gap between them. The annular gap is sealed at both ends. The optical fibers are inserted into the annular gap through apertures in the end seals (8). The spliced connections and a length of optical fibers are stored in the annular gap. The splice carrier (5) surrounds the means (21, 3) for the mechanical and electrically conductive joining and is attached to the electrically conductive joining means (3) or to the aerial cables (1).

11 Claims, 3 Drawing Sheets

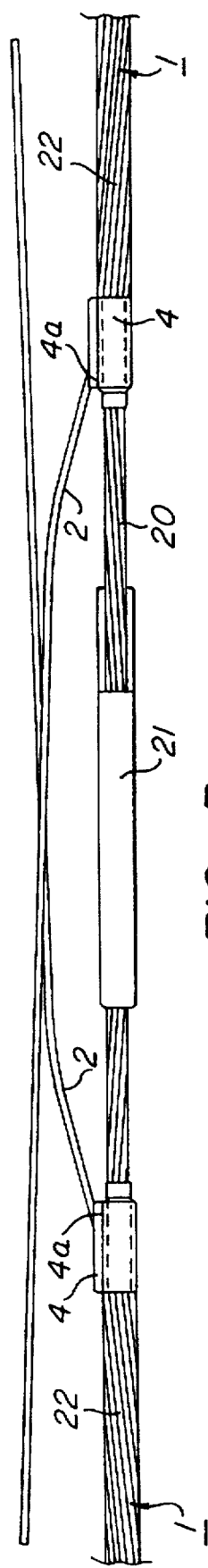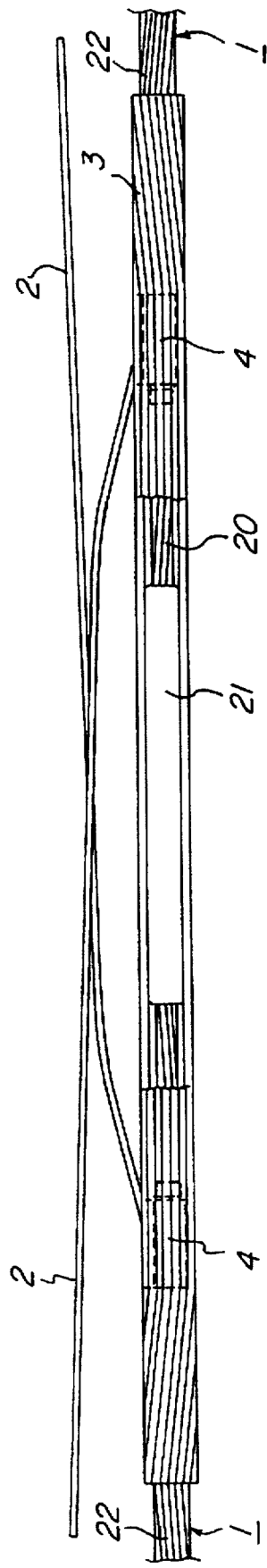
FIG. 3a
FIG. 3b

DEVICE FOR CONNECTING TWO ELECTRIC AERIAL CABLES

BACKGROUND OF THE INVENTION

1. Technical Field

The invention concerns a device for connecting two electric aerial cables with tubes containing optical fiber elements made of optical fibers, which are cabled together with electric conductors and strength elements. Means are provided for the mechanical and electrically conductive joining of the electric conductors and strength elements of the respective aerial cable. A sealed splice carrier receives the spliced connections of the optical fibers.

2. Description of the Prior Art

A sleeve for connecting overhead conductor cables each containing an optical communications line is known from DE 42 32 714. The sleeve contains a tube casing which has two metal face disks at the ends. A profile rod passes through the sleeve casing and protrudes from the sealed face disks of the sleeve casing. Cable adapter bushings are inserted and sealed in openings of the face disks. Outside of the sleeve casing, the cable adapter bushings which encompass the overhead cable are connected to the profile rod by means of feeder clamps. Thus, the electrical connection of the overhead cable ends is achieved with the first cable adapter bushing, the first feeder clamp, the profile rod, the second feeder clamp and the second cable adapter bushing.

The connection of the communication lines is accomplished by baring the communications cables which enter the inside of the sleeve casing through the face disks in the cable adapter bushing areas, splicing the optical fibers with each other and storing the spliced connections in splice organizers. One or more splice organizers are attached to the profile rod.

The disadvantage of this sleeve is that a number of seals must be provided. Thus the inserts at the cable adapter bushings, as well as the profile rod and the tube casing resting on the face disks must be sealed with respect to the face disks.

A connecting sleeve for optical fiber-phase cables is known from EP 0 548 514 A1, where the electrical connection of the phase cables is achieved with a bus bar connected by cable clamps to the overhead cable. The protection tubes containing the optical fibers are inserted into a sleeve casing through cable bolts where they are tension-relieved and sealed. The sleeve casing is composed of two hood-shaped casing halves, which are bolted to each other through a flange-type expansion. On the inside of the sleeve casing, each casing half has a rod whose ends are attached to each other in removable form. The rod supports one or more splice organizers in which the spliced connections and the lengths of optical fibers are stored. Sealing the area which receives the splice organizers is rather expensive with this sleeve as well.

Both sleeves have in common that in case of tensile strain these sleeves could leak due to the number of sealed areas. Said sleeves are thus only suitable for installation in the tension-relieved field area of an anchor pole. Another disadvantage is that the spliced connections are stored in splice organizers.

SUMMARY OF THE INVENTION

An object of the present invention is to provide a device for connecting electric aerial cables, which is easy to manufacture and whose seals are configured so that no leaks occur in case of tensile strain. The use of splice organizers is furthermore omitted. Beyond that, the device must be configured so that it is possible to locate the device between the poles.

A significant advantage of the invention is that connection fittings, which are within the state of the art of cable laying, can be used. The invention makes it possible not to use route guides and to install the device at any place along the cable route.

The invention will be fully understood when reference is made to the following detailed description taken in conjunction with the accompanying drawings.

BRIEF DESCRIPTION OF THE DRAWINGS

FIG. 3a is a side elevational view illustrating the joining of the steel-aluminum wires by the compression connection which is partially broken away for clarity of illustration; and FIG. 3b is a side elevational view illustrating the joining of the aluminum wires by the aluminum spiral which is partially broken away for clarity of illustration.

DETAILED DESCRIPTION OF THE INVENTION

Figure 1:
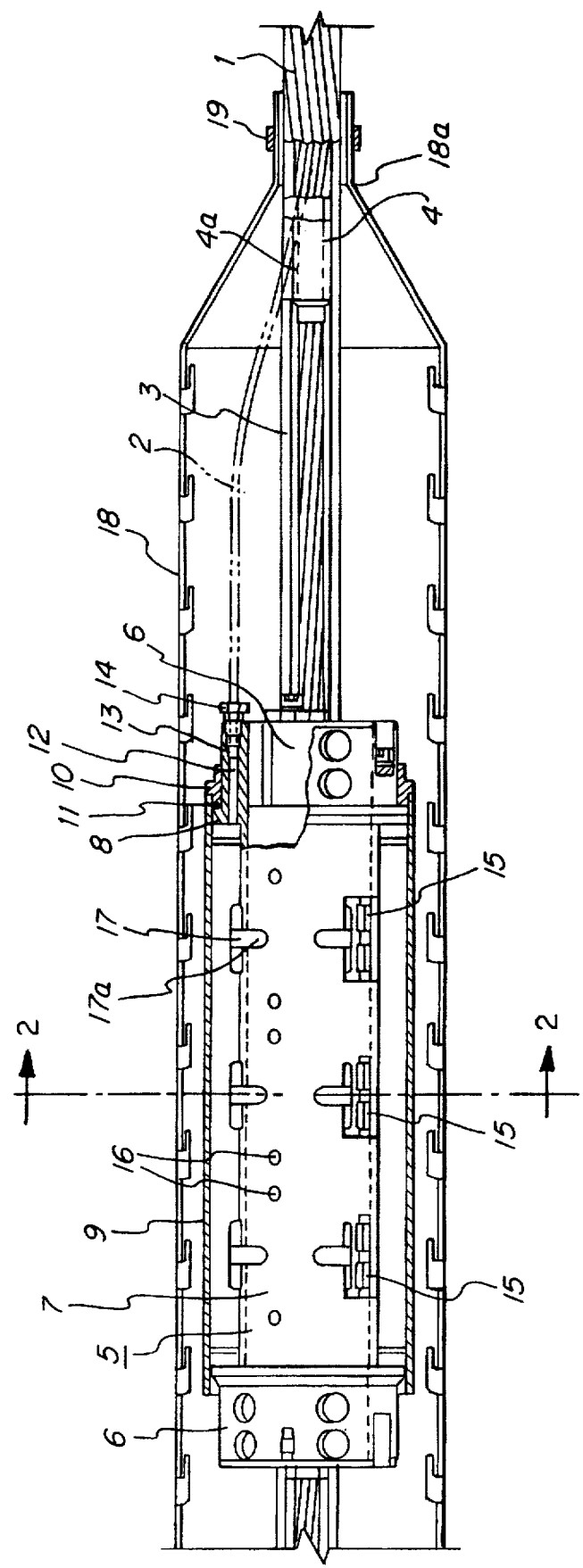
FIG. 1 is a side elevational view of a device for connecting two aerial cable in accordance with the present invention, the device having portions removed and broken away for purposes of illustration.

Turning to FIG. 1, therein is illustrated a device for connecting two optical fiber-electrical conductor aerial cables 1 (one shown). Such a cable 1 usually comprises a central core of five steel-aluminum strength wires 20 (FIGS. 2, 3a and 3b) which form a strength member for absorbing tension forces on the cable and a high-grade or high-tensile steel tube 2 containing at least one optical fiber (not shown). In this construction, the tube 2, a longitudinally welded tube with the same outside diameter as the steel-aluminum wires, replaces one of the steel-aluminum wires of the core. The steel-aluminum wires 20 are steel wires that have been provided with a layer of aluminum. The cable 1 also includes twelve aluminum electrically conductive wires 22 (FIGS. 3a and 3b) surrounding the central core.

In order to join two such aerial cables, the aluminum wires 22 are separated, the tube 2 is separated from the central core and the remaining steel-aluminum wires 20 are shortened so that the tube 2 containing the optical fibers extends beyond the end of aerial cable 1.

The two central cores of the aerial cables 1 to be joined are attached to a compression connector 21 (FIGS. 2, 3a and 3b) or to an extension-proof spiral fitting, of the kind known in the cable technology. The central cores are fixed in the connector 21 by radially compressing the connector 21.

The aluminum wires 22 are connected to an aluminum spiral 3, whose individual rods enter between the ends of the aluminum wires 22 in the aerial cable 1, parallel to the longitudinal axis of the aerial cable 1. In the area of guide ring 4, one aluminum rod is missing from the complete coverage, so that the tube 2 can protrude. To that end, the aluminum spiral 3 is equipped with the guide ring 4 containing a longitudinal slit 4a of a predetermined length, through which the tube 2 can protrude.

A splice carrier 5 is clamped over the aluminum spiral 3 by means of two clips 6. The splice carrier 5 comprises an inside tube 7, which has a flange 8 at both ends, and an outside tube 9 which rests on the flanges 8. The outside tube 9 is able to move on the flanges 8 to provide access from the outside to the annular gap which is formed between the inside tube 7, the outside tube 9 and the flange 8. The seal between outside tube 9 and flange 8 is accomplished with a clamp collar 10 and a sealing ring 11.

The flanges 8 contain a longitudinal bore 12 through which the optical fiber located in the tube 2 can be inserted into the annular gap. The tube 2 is separated from the optical fibers and is sealed and secured to the inlet area of the longitudinal bore by means of a tube fitting 13, 14.

Several splicing combs 15 are attached to the surface of the inside tube 7, in which the spliced connections of the optical fibers can be stored. Two spacer bolts 16 which belong to each splicing comb 15 are also attached to the surface of the inside tube 7, around which the lengths of optical fibers are wound.

Furthermore, a finger 17 belongs to each splicing comb 15, which is also attached to the surface of the inside tube 7. The fingers 17 have an area 17a which forms a gap between itself and the surface of the inside tube 7, into which the windings of the respective lengths of optical fibers are inserted to secure them against the curved surface of the inside tube 7. In this way, the lengths of optical fibers are stored in a curved plane.

The splice carrier 5 is surrounded by a protective casing 18, whose ends 18a are secured to the aerial cable 1 or to the aluminum spiral 3 by means of clamps 19. The protective casing 18 can comprise two half shells, which are sealed at their longitudinal contact surfaces. However, the protective casing 18 can also comprise at least two casing halves that extend across the longitudinal direction of the aerial cable 1, which are bolted together.

The inside tube 7, the outside tube 9 and the protective casing 18 can be advantageously made of metal, preferably a non-corroding steel. The splicing combs 15, the spacer bolts 16 and the fingers 17, which are secured to the surface of the inside tube 7, can be advantageously soldered to the surface, or they can be soldered or welded into corresponding apertures.

The gap between the inside tube 7 and the outside tube 9, which receives the spliced optical fibers, is closed and sealed against moisture. Most of the mechanical forces are dissipated by the compression connector or the spiral fitting. The aluminum spiral 3 provides an electrically conductive connection to all the aluminum wires 22.

It should be appreciated by those skilled in the art that equivalent structure to elements 2, 3, 4, 4a, 10, 11, 12, 13, 14 and 19 would also be found on the left-hand side of FIG. 1 to connect the second aerial cable to the first cable 1 using the connecting device of the present invention.

Figure 2:
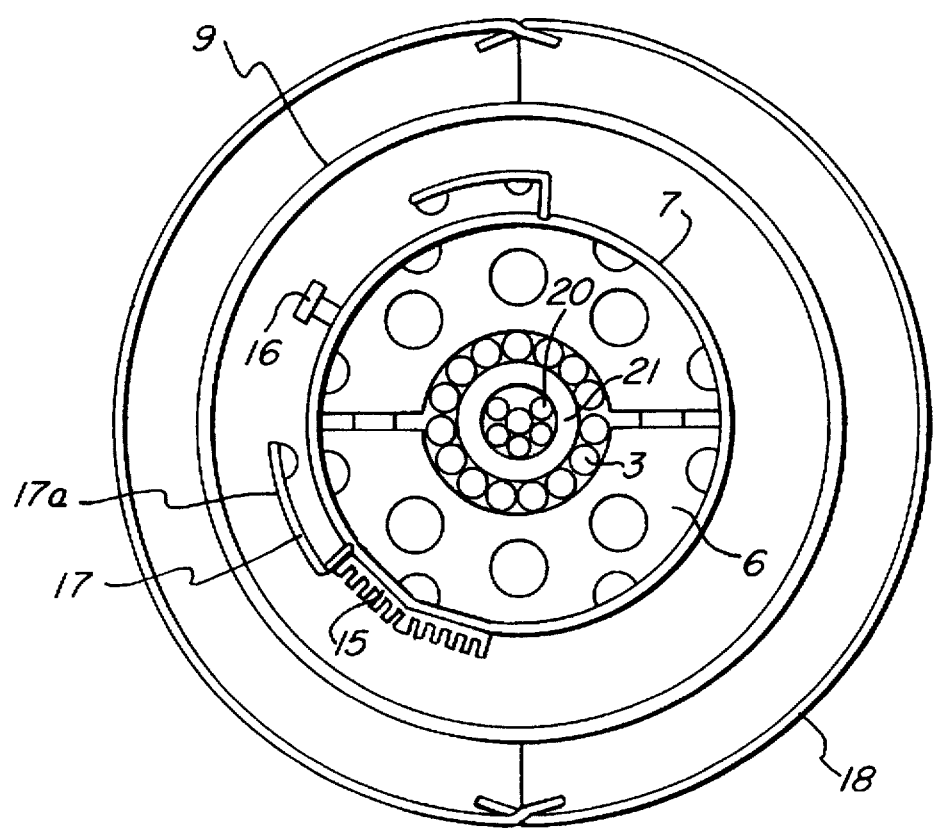
FIG. 2 is a cross-sectional view taken along the 2—2 line of FIG. 1.

FIG. 2 illustrates a cross section through the center of the device. The steel-aluminum wires 20 are surrounded by the compression connector 21. The rods of the aluminum spiral 3 are located over the compression connector 21.

The not illustrated fiber length is attached to the curved surface of the inside tube 7 by means of the fingers 17 and the spacer bolts 16.

FIGS. 3a and 3b illustrate the joining of the steel-aluminum wires 20 by the compression connector 21 and the joining of the aluminum wires 22 by the aluminum spiral 3.

The tubes 2 protrude from the cores formed by the steel-aluminum wires 20 and are longer because of the corresponding shortening of the aerial cables 1.

The preferred embodiment described above admirably achieves the objects of the invention. However, it will be appreciated that departures can be made by those skilled in the art without departing from the spirit and scope of the invention which is limited only by the following claims.

What is claimed is:

1. A device for connecting two aerial cables, each cable having at least one tube with optical fibers therein, the at least one tube being cabled together with electric conductors and a strength member, the device comprising:

(a) joining means for mechanically joining the strength members and electrically joining the electric conductors of the respective aerial cables, (b) a first tube surrounding at least a portion of the joining means;

(c) a second tube concentric with the first tube and forming an annular gap therebetween; and (d) seals at both ends of the first and second tubes sealing the annular gap, each of the seals having at least one aperture through which the optical fibers are inserted into the annular gap so at least a portion of the optical fibers and any spliced connections thereof are stored in the annular gap.

2. A device as claimed in claim 1, wherein, the strength members of the two aerial cables are mechanically secured by a compression connector and the electric conductors are electrically connected through an aluminum spiral.

3. A device as claimed in claim 1, wherein the at least one aperture for inserting the optical fibers are sealed by means of tube fittings.

4. A device as claimed in claim 1, wherein the first and second tubes can shift longitudinally relative to one another upon release of one of the seals, the seals include a rubber ring.

5. A device as claimed in claim 1, further including a metal protective casing surrounding the second tube with a clearance therebetween, the casing being tapered at both ends thereby resting against the aerial cables and being secured to the aerial cables by clamps.

6. A device as claimed in claim 5, wherein the protective casing is a cylindrical metal tube with a conical hood bolted to each of its ends.

7. A device as claimed in claim 1, further including a guide ring resting on the strength member of each aerial cable, the guide ring having a slit of a predetermined length defined therein through which the at least one tube containing the optical fibers protrudes.

8. A device as claimed in claim 1, further including at least one splicing comb attached to an outside portion of the first tube.

9. A device as claimed in claim 8, wherein the outside portion of the first tube is curved and the splicing comb is curved in accordance with the outside surface of the first tube.

10. A device as claimed in claim 9, further including several spacer bolts as well as several guide fingers attached to an outside portion of the first tube.

11. A device as claimed in claim 1, further including several spacer bolts as well as several guide fingers attached to an outside portion of the first tube.

* * * * *

UNITED STATES PATENT AND TRADEMARK OFFICE
CERTIFICATE OF CORRECTION

PATENT NO. : 5,727,100
DATED : March 10, 1998
INVENTOR(S) : Franz Grajewski et al.

It is certified that error appears in the above-identified patent and that said Letters Patent is hereby corrected as shown below:

On the title page, item
[75], change "Buchwadd" to --Buchwald--.

Signed and Sealed this

Fifth Day of May, 1998

Attest:

BRUCE LEHMAN

Attesting Officer

Commissioner of Patents and Trademarks